Nov. 1, 1932.    J. WHYTE    1,886,141
BRAKE
Filed March 26, 1930    2 Sheets-Sheet 1
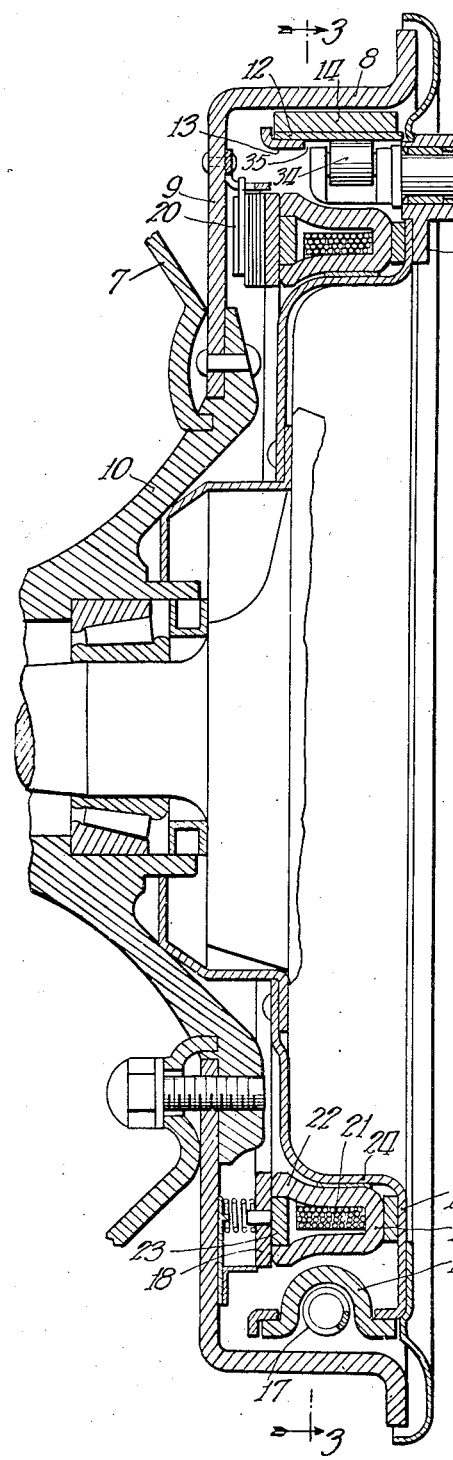
Fig. 1.
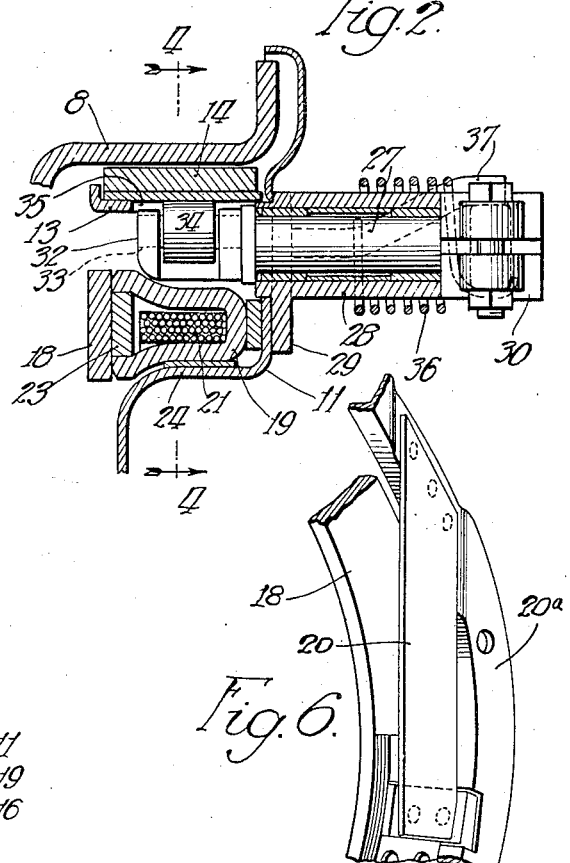
Fig. 2.
Fig. 6.
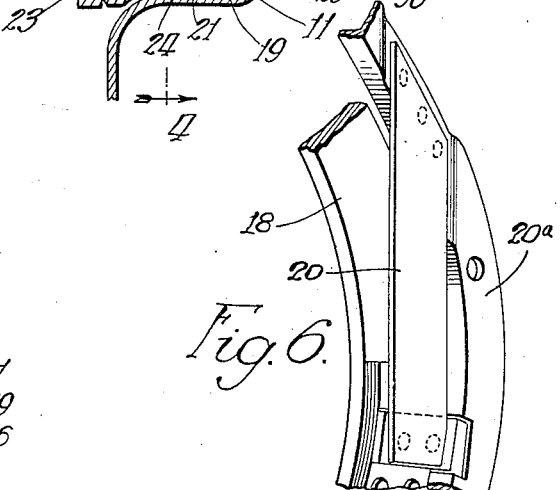
Inventor
John Whyte
By: Churchill Parker & Carlson
Attys.

Nov. 1, 1932.  J. WHYTE  1,886,141
BRAKE
Filed March 26, 1930  2 Sheets-Sheet 2
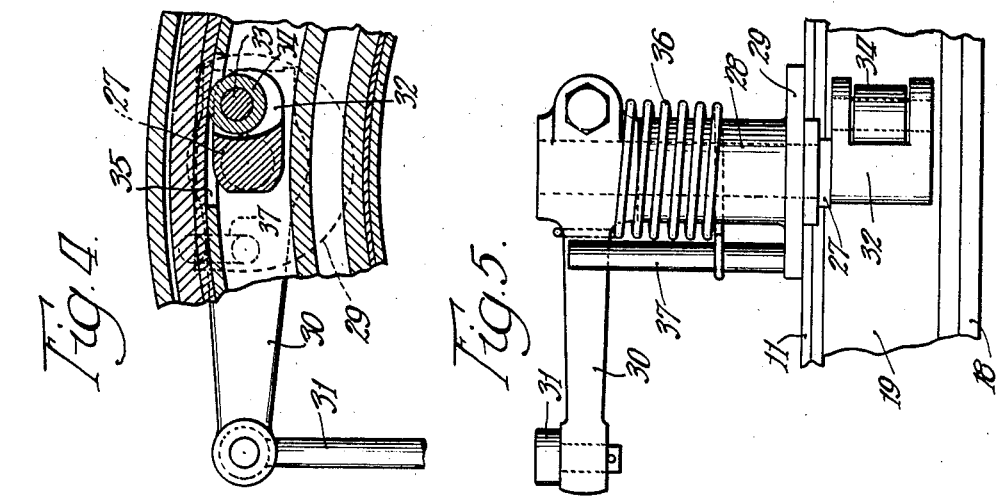
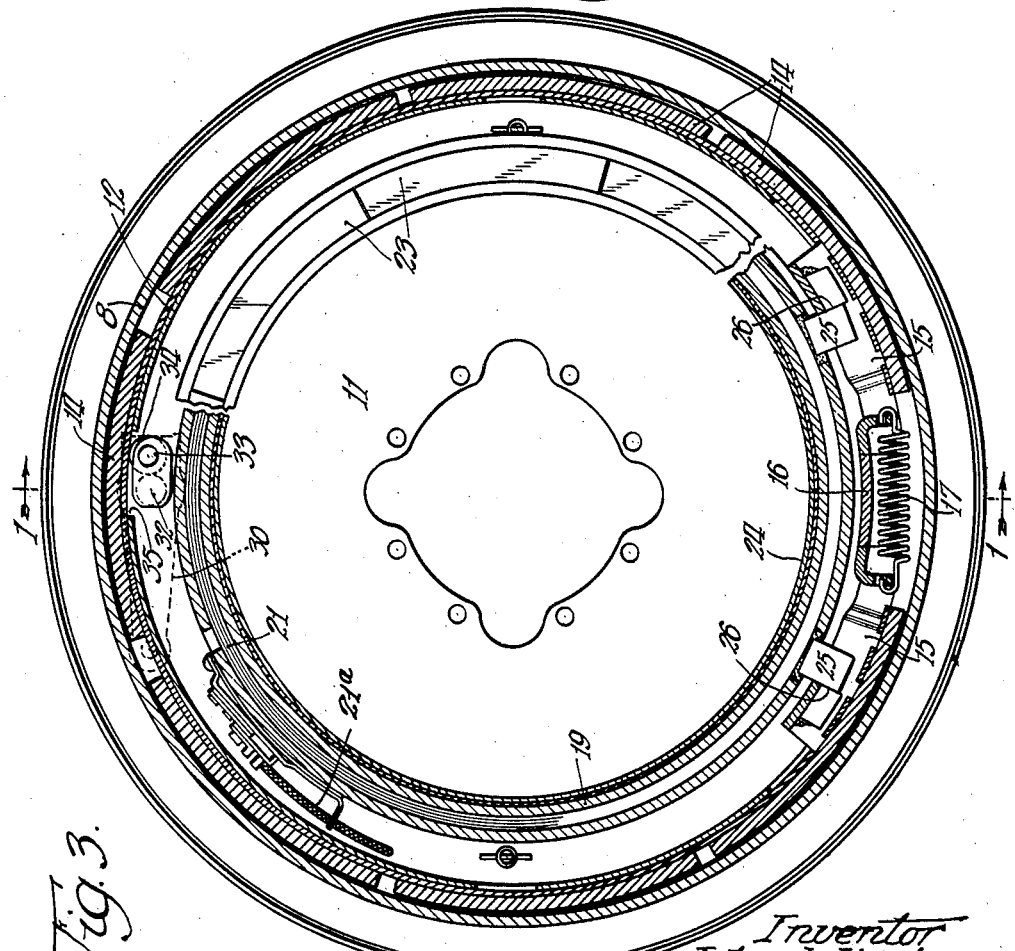
Inventor
John Whyte Patented Nov. 1, 1932

1,886,141

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

BRAKE

Application filed March 26, 1930. Serial No. 438,922.

This invention relates to friction brakes for vehicles and the like and more particularly to a brake having a plurality of independent operators therefor.

The primary object of the invention is to provide a friction brake for vehicles having an operator to be used for emergency or parking purposes operable independently of the main brake operator and incorporated in the brake in a novel manner so as to form a combined unit which is simple and inexpensive in construction and efficient and reliable in operation.

A more detailed object is to provide a friction brake of the drum type having a braking member which operates with a full wrapping action when actuated by the main or primary operator and with a lesser degree of wrapping action when actuated by an auxiliary or emergency operator.

Other objects and advantages of the invention will become apparent from the following detailed description taken in connection with the accompanying drawings, in which, Figure 1 is a sectional view of a vehicle brake embodying the features of the present invention, the section being taken substantially along the line 1—1 of Fig. 3.

Fig. 2 is a fragmentary sectional view showing on a larger scale a portion of the brake shown in Fig. 1.

Fig. 3 is a sectional view taken substantially along the line 3—3 of Fig. 1.

Fig. 4 is a section taken along the line 4—4 of Fig. 2.

Fig. 5 is a fragmentary plan view of a portion of the brake as shown in Fig. 1.

Fig. 6 is a fragmentary perspective view of a portion of the brake actuating mechanism.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In its exemplary form, the invention is embodied in a brake of the internal expanding type for use on a vehicle wheel 7. The rotatable braking member is the internal surface of a drum 8 having the usual flange 9 secured to the inner end of the wheel hub 10 and closed at its open end by an anchor plate 11 rigid with a non-rotatable support.

The non-rotatable braking member is of the band type comprising a flexible strip of metal 12 encircling and supported by an inturned flange 13 of the anchor plate 11 and carrying segments 14 of friction material which form a substantially continuous surface adapted for gripping engagement with the drum surface. The ends of the band are disposed adjacent each other on one side of the drum and carry fittings 15 whose ends face each other and abut against the opposite end surfaces of a stop 16 rigid with the anchor flange 13. Normally, the fittings are drawn into abutting engagement with the stop by a contractile spring 17 which thereby maintains the brake released but permits either end of the band to be moved freely away from the stop.

The primary operator, which is normally used by the vehicle driver to set the brake, is associated with the end portions of the band. While it may be actuated mechanically, by fluid pressure or other preferred means, the one shown herein is electrically controlled and operates frictionally to derive any actuating force from the momentum or motion of the vehicle. The operator comprises generally two friction rings 18 and 19 of magnetic material arranged concentric with the drum within the brake structure and adapted for axial gripping engagement. The ring 18 constitutes the magnetic armature and is floatingly suported for rotation with the drum by a plurality of annularly arranged and tangentially extending metal strips 20 each having its opposite end secured to a ring 20ª on the flange 9 and the back of the ring 18 respectively.

The ring 19 constitutes the magnet proper and is U-shaped in cross section with a winding 21 disposed between its two concentric poles 22 which are separated by plates 23 of wear-resisting material. The magnet is supported for oscillation about the drum axis by a cylindrical portion 24 of the anchor plate 11.

Projecting rigidly from the outer magnet pole are two circumferentially spaced lugs 25 associated with shoulders 26 on the band fittings 15. Upon movement of the magnet ring 19 in either direction away from the normal-brake-released position shown in Fig. 3, one or the other of the lugs will move its end of the band away from the stop 16 thereby expanding the band.

The magnet moves a limited distance whenever the winding 21 is energized with the wheel in motion, the energizing current being carried through an insulating conductor 21ª. Such energization causes gripping engagement between the friction surfaces of the two rings whereupon the magnet ring moves with the wheel, carrying one end of the band away from the stop 16 a limited distance in the direction or rotation of the wheel. After the normal clearance has been taken up, slippage occurs between the rings but the brake remains set so long as the winding 21 remains energized. When the circuit is interrupted, the spring 17 acts to return the actuated end of the band and also the magnet to released position.

When either end of the brake band above described is pressed outwardly against the drum, the rotating surface of the latter tends to carry each section of the band toward the point of anchorage formed by the stop 16, thereby greatly increasing the compressive force on the band with a resultant augmentation of the braking effect produced by the main operator alone. This is commonly called a self-energizing or wrapping action and in the present instance is allowed to build up throughout the entire length of the band since the latter is arranged to anchor at either of its ends depending on the direction of rotation of the drum. As a result, an extremely powerful retarding force is applied to the wheel.

The auxiliary operator for the band, which is intended to be used for emergency or parking purposes, comprises generally a means which is associated with a different section of the band than the main operator and acts to press such section radially against the drum whereupon the section becomes the seat of a self-energizing or wrapping action which builds up in one end portion or the other of the band between the auxiliary operator and the point of anchorage. In order that the self-energizing action and therefore the resulting retarding force obtained with the auxiliary operator will be substantially the same regardless of the direction of rotation of the drum, it is preferred to apply the radial pressure to the band substantially at its longitudinal center.

The means for applying this pressure is thus spaced circumferentially from the main operator and located in the narrow radial space between the anchor plate flange 13 and the outer magnet pole. In its present form, it comprises a bell-crank lever including a rock shaft 27 journaled in a sleeve 28, one end of which projects through an aperture in the outer portion of the anchor plate 11 diametrically opposite from the main brake operator. The sleeve is secured to the anchor plate through the medium of a flange 29.

One arm of the bell-crank is in the form of a crank 30 rigid with the outer end of the shaft and adapted to be connected by means including a link 31 to a hand lever (not shown) by which the emergency or parking brake of a vehicle is usually actuated.

Rigid with the inner end of the shaft 27 is a relatively short arm 32 which projects longitudinally of the annular space between the magnet and anchor flange 13. This arm is bifurcated as shown in Fig. 5 and at its free end carries a cross pin 33 on which is rotatably mounted a roller 34 disposed in and projecting through a slot 35 in the anchor plate flange 13. The roller bears against the internal surface of the metal band 12 when the bell-crank is actuated and serves to relieve friction thereby permitting the engaged portion of the band to move freely in a circumferential direction while the radial pressure is applied.

When the pressure is relieved, a torsion spring 36 acting between the crank 30 and a stop bar 37 moves the bell-crank in a direction to retract the roller 34 out of engagement with the band 12, this movement being limited by engagement of the crank and the stop bar which is rigid with the anchor plate.

Whenever the linkage for actuating the bell-crank is placed under tension, the arm 32 is moved toward the band and forces the medial section of the latter outwardly thereby pressing the middle segment 14 against the drum surface. The rotating drum surface, acting frictionally on this segment, tends to carry the latter along with it thereby inducing a self-energizing action in the end portion of the band beyond the point of application of the radial force. The stop 16 serves as an anchor for this section of the band with the result that the end portion of the band is placed under compression and thereby expanded against the drum producing a retarding action on the vehicle wheel. The unanchored end of the band, being adapted for abutting engagement with the stop, is free to move away from the stop but does not come into play since it is not placed under compression. When the pressure exerted by the bell crank is relieved, the spring 17 acts to contract the band out of engagement with the drum.

Application of the radial pressure when the vehicle is moving in the opposite direction will cause the self-energizing action to be created in the other end portion of the band. In other words, that end portion of the band which is expanded upon actuation of the auxiliary operator is determined by the direction of rotation of the drum. Inasmuch as the pressure is exerted in a radial direction, the engaged section of the band will be free to move circumferentially without varying the magnitude of the pressure. In this way, the applied pressure and, therefore, the retarding effect can be gaged accurately by the driver. For the same reason, the linkage for actuating the secondary operator need be adapted for only a narrow range of movement. Its adjustment is not affected materially by wear of the band surface.

The emergency brake thus provided is exceedingly inexpensive to construct because it utilizes the same braking member as the main operator without interfering in any way with the operation of the latter. Both operators are, therefore, equally effective in either direction of rotation of the drum, the main operator acting with a full-wrap action while the emergency brake is of the half-wrap type.

I claim as my invention:

1. A friction brake combining a rotatable drum having its open end closed by an anchor plate, a friction member encircling the internal drum surface with its opposite ends disposed adjacent each other, a stop rigid with said anchor plate and serving to anchor one end or the other of said member depending on the direction of rotation of the drum when the band is expanded, a main operator associated with said ends including a ring mounted within the drum for oscillation about the drum axis and adapted upon movement in either direction away from a normal brake-released position to carry one end or the other of said member away from said stop and thereby cause the entire length of said member to be expanded against the drum, and an auxiliary operator including a bell-crank journaled in said anchor plate and having an arm disposed externally of said plate and having and a second arm disposed in and extending longitudinally of the annular space between said ring and member and adapted when actuated to press the intermediate portion of said member outwardly against the drum whereby to create a self-energizing action in one end portion or the other of said member depending on the direction of rotation of the drum at the time of such actuation, the bearing engagement between said arm and member permitting free circumferential movement of the engaged section of the member.

2. A friction brake combining a rotatable drum, a friction band encircling a cylindrical surface of said drum with its opposite ends disposed adjacent each other on one side of said drum, a non-rotatable stop for anchoring one end or the other of said band depending on the direction of rotation of the drum, a main operator having a circumferentially movable element associated with said ends and adapted upon movement in either direction away from a normal brake-released position to move one end of the band away from said stop whereby to induce a self-energizing action through the entire length of the band, and an auxiliary operator adapted when actuated independently of the main operator to apply a radially directed force to a section of the band intermediate said ends and spaced circumferentially from said main operator whereby to induce a self-energizing action in one end portion or the other of the band depending on the direction of rotation of said drum, said stop serving to anchor either end of said band when actuated by said auxiliary operator.

3. A friction brake combining a rotatable drum, a braking member extending around a cylindrical surface of said drum with its ends disposed adjacent each other, a non-rotatable stop for anchoring either of said ends arranged for abutting engagement with the ends so as to permit circumferential movement of either end in one direction, a main operator operatively associated with said ends, and an auxiliary operator having a bearing engagement with a portion of said member spaced circumferentially from said main operator and adapted when actuated to press such portion into gripping engagement with the drum surface and to permit circumferential movement of the engaged portion during the application of pressure thereto.

4. A friction brake combining a rotatable drum, a braking member cooperating with a cylindrical surface of said drum and extending substantially around the entire drum circumference with its opposite ends disposed adjacent each other, a primary operator acting on at least one of said ends for forcing the same against the drum, a secondary operator adapted to be actuated mechanically and acting on a portion of said member spaced circumferentially from said primary operator, and means for anchoring one or the other of said ends against circumferential movement depending on the direction of rotation of the drum when said secondary operator is actuated, said anchoring means permitting circumferential movement of the opposite end of the member in the direction of rotation of the drum.

5. A friction brake combining a rotatable drum, a braking member cooperating with a portion of the internal cylindrical surface of said drum, anchoring means associated with the end portions of said member and serving to hold one end or the other against circumferential movement while permitting circumferential movement of the other end, and means for applying an actuating force to an intermediate portion of said member in a generally radial direction whereby to cause one end portion or the other to be placed under longitudinal stress and thereby expanded against the drum depending on the direction of rotation of the drum at the time when said force is applied.

6. A friction brake combining a rotatable drum, a band extending substantially around the internal drum surface with its ends disposed adjacent each other on one side of the drum, means engageable with said ends and acting to anchor one end or the other against circumferential movement while permitting movement of the other end away from its anchoring point, a primary actuating means for pressing one end or the other of said band against the drum and thereby cause a wrapping action to build up throughout the entire length of band regardless of the direction of rotation of the drum, and an independent secondary operator adapted when actuated to press an intermediate portion of said band against the drum causing a wrapping action to build up in a shorter section of the band between the point of force application and said anchoring means.

7. A friction brake combining a rotatable drum, a braking member engageable with and extending substantially around a cylindrical surface of said drum, said member being adapted to anchor at either of its adjacent ends, a primary operator associated with said ends, and an independent mechanical operator adapted when actuated to press the central portion of the member against the drum and thereby cause one end portion or the other of the member to be forced against the drum depending on the direction of rotation.

8. A friction brake combining means providing a rotatable cylindrical surface, an elongated braking member cooperating with said surface and adapted to anchor at either of its end portions either of said ends being free to move circumferentially around said surface when the other end portion is anchoring, and means for applying an actuating force to an intermediate portion of said member to produce a self-energizing action in one end portion of the member when said surface is rotating in one direction and in the opposite end when the surface is rotating in the reverse direction.

9. A friction brake combining a rotatable drum, a brake band extending substantially around the entire drum surface with its opposite ends disposed adjacent each other, a main operator located adjacent said ends and adapted when actuated to force one or the other of said ends in a circumferential direction depending on the direction of rotation of the drum, an auxiliary operator having a bearing engagement with an intermediate section of said band and adapted when actuated to press such section in a radial direction against the drum, and an anchoring means common to both of said operators and acting to hold one end or the other of said ends against circumferential movement when either of said operators is actuated thereby allowing a self-energizing action to develop through the entire length of the band under the control of said main operator and through a shorter length of the band under the control of said auxiliary operator.

10. A friction brake combining a rotatable drum, a braking member cooperating with a cylindrical surface of said drum and extending substantially around the entire drum circumferential with its opposite ends disposed adjacent each other, an operator acting on at least one end portion of the member for forcing the same against the drum, a second operator acting on a portion of said member spaced circumferentially from said first mentioned operator and adapted to press the engaged portion of the member against the drum surface while permitting circumferential movement of such engaged portion, and means for anchoring one or the other of said ends against circumferential movement depending on the direction of rotation of the drum when said second operator is actuated.

11. A friction brake combining means providing a rotatable cylindrical surface, anchoring means adjacent said surface providing two stop surfaces, an elongated braking member extending around said rotatable surface with its opposite end portions adapted respectively for abutting engagement with said stop surfaces, each of said end portions being free to move in one direction away from the stop surface engaged thereby, means for applying an actuating force to an intermediate portion of said member to press such portion into gripping engagement with said rotating surface and thereby produce a self-energizing action in one or the other of said end portions of the member depending on the direction of rotation of said first mentioned surface.

In testimony whereof, I have hereunto affixed my signature.

JOHN WHYTE.